United States Patent
Beichl et al.

(10) Patent No.: US 7,523,943 B2
(45) Date of Patent: Apr. 28, 2009

(54) SEALING ARRANGEMENT FOR SEALING A GAP BETWEEN TWO COMPONENTS WHICH CAN ROTATE IN RELATION TO EACH OTHER ABOUT A COMMON ROTATIONAL AXIS

(75) Inventors: Stefan Beichl, Herrsching (DE); Alexander Rauschmeier, Munich (DE)

(73) Assignee: MTU Aero Engines GmbH, Munich (DE)

( * ) Notice: Subject to any disclaimer, the term of this patent is extended or adjusted under 35 U.S.C. 154(b) by 0 days.

(21) Appl. No.: 10/518,483

(22) PCT Filed: Jun. 13, 2003

(86) PCT No.: PCT/DE03/01973

§ 371 (c)(1),
(2), (4) Date: Jul. 13, 2005

(87) PCT Pub. No.: WO04/001257

PCT Pub. Date: Dec. 31, 2003

(65) Prior Publication Data

US 2006/0131814 A1 Jun. 22, 2006

(30) Foreign Application Priority Data

Jun. 21, 2002 (DE) .................... 102 27 630

(51) Int. Cl.
*F01D 11/02* (2006.01)
(52) U.S. Cl. ........................................ 277/355
(58) Field of Classification Search ............. 277/355
See application file for complete search history.

(56) References Cited

U.S. PATENT DOCUMENTS

| | | | | | |
|---|---|---|---|---|---|
| 3,345,035 | A | * | 10/1967 | Johnson et al. | 416/220 R |
| 3,773,336 | A | * | 11/1973 | Walter et al. | 277/551 |
| 4,330,234 | A | * | 5/1982 | Colley | 415/173.2 |
| 4,595,207 | A | * | 6/1986 | Popp | 277/303 |
| 5,029,875 | A | | 7/1991 | Spain | |
| 5,074,748 | A | * | 12/1991 | Hagle | 415/170.1 |
| 5,310,319 | A | * | 5/1994 | Grant et al. | 416/220 R |
| 5,961,279 | A | * | 10/1999 | Ingistov | 415/170.1 |
| 6,120,622 | A | * | 9/2000 | Mayr et al. | 148/516 |

(Continued)

FOREIGN PATENT DOCUMENTS

DE    35 07 638 A1    3/1985

(Continued)

OTHER PUBLICATIONS

International Search Report, Jun. 13, 2003.

*Primary Examiner*—Patricia L Engle
*Assistant Examiner*—Gilbert Y Lee
(74) *Attorney, Agent, or Firm*—Crowell & Moring LLP

(57) ABSTRACT

A sealing arrangement for sealing a gap between two components which can move rotationally with respect to one another about a common axis of rotation, having a brush seal on a first component which interacts with a sealing surface of the second component. The sealing surface is conical in form, with at least one component being axially displaceable and adjustable with respect to the other component in order to reduce the gap between the brush seal and the second component.

4 Claims, 2 Drawing Sheets

U.S. PATENT DOCUMENTS

| | | | | |
|---|---|---|---|---|
| 6,152,454 | A | * | 11/2000 | Marnot ..................... 277/551 |
| 6,299,824 | B1 | * | 10/2001 | Mayr et al. ................. 266/87 |
| 7,226,054 | B2 | * | 6/2007 | Addis ......................... 277/355 |

FOREIGN PATENT DOCUMENTS

| | | |
|---|---|---|
| DE | 100 18 273 A 1 | 4/2000 |
| EP | 0 561 565 A1 | 3/1993 |
| EP | 1 046 841 A2 | 10/2000 |

* cited by examiner

SEALING ARRANGEMENT FOR SEALING A GAP BETWEEN TWO COMPONENTS WHICH CAN ROTATE IN RELATION TO EACH OTHER ABOUT A COMMON ROTATIONAL AXIS

This application claims the priority of German application no. 10227630.7, filed Jun. 21, 2002, and PCT International Patent Application No. PCT/DE03/01973, filed Jun. 13, 2003, the disclosure of which is expressly incorporated by reference herein.

BACKGROUND AND SUMMARY OF THE INVENTION

The invention relates to a sealing arrangement for sealing a gap between two components which can move rotationally with respect to one another about a common axis of rotation.

The use of brush seals for sealing two components which can move rotationally with respect to one another is well known. The brush seal in this case substantially comprises a brush casing, which is mounted in the first component, and a plurality of bristles which have been introduced into the brush casing and the free ends of which are directed onto a sealing surface of the second component. In particular in turbomachines, such as for example steam turbines or gas turbines, brush seals are used to seal an annular gap between rotor and stator. A brush seal of this type has been disclosed, for example, by DE 100 18 273 A1.

In known brush seals of this type, it is primarily the gap between the two components which can move rotationally with respect to one another, i.e. the gap between the brush seal fitted into the stator, on the one hand, and the sealing surface of the rotationally movable rotor, on the other hand, which is the determining factor in terms of the sealing action achieved. It is known that a brush seal of this type cannot be designed with a large coverage, since otherwise the driving losses and the resultant generation of heat increase correspondingly. This means that accurate production is required. This proves disadvantageous since accurate production is known to be associated with high production costs.

A further drawback of the known brush seals is that in the event of a drop in the sealing action of the brush seal it is necessary to replace the entire brush seal in question. It is not possible to "reset" the brush seal, for example for reasons of wear, in order thereby to retain the sealing function of the brush seal. The fact that the sealing function of the brush seal cannot be reset shortens the service life, which in turn entails additional costs.

The invention is based on the object of providing a remedy to this and of allowing simple adjustment of the gap between the two components which can move rotationally with respect to one another and therefore of allowing adjustment of the sealing action or resetting of the sealing function of the fitted brush seal.

Working on the basis of a brush seal of the type described in the introduction, which is fitted between two components which can move rotationally with respect to one another with a common axis of rotation, this object is achieved, according to the invention, by virtue of the fact that the first component, in which the brush casing is mounted, is mounted such that it can be axially displaced and adjusted along the axis of rotation, and that the sealing surface of the second component, onto which the bristles of the brush seal are directed, is conical in form.

It is now possible, in a surprisingly simple way, to adjust the gap between the two components and thereby to control the sealing action of the brush seal fitted between the two components.

The sealing arrangement according to the invention leads to significant advantages.

For example, the axial displaceability of the first component allows optimum adjustment of the brush seal during initial installation. Moreover, the configuration of the sealing arrangement according to the invention ensures simplified fitting of the brush seal.

Furthermore, in the event of wear to the brush seal the latter can be "reset". The resetting is effected by axial displacement of the first component towards the second component. The conical configuration of the sealing surface according to the invention as a result reduces the gap between the two components, which means an increase in the sealing function of the brush seal. This further optimizes the leakage rate, which inter alia means a lengthening of the service life.

A further advantage is that the manufacturing tolerances can be increased, since the brush seal can be adjusted during fitting. This leads to a reduction in production costs.

It is preferable for means for axial displacement and adjustment to be provided between the first component and a surrounding casing.

According to one embodiment of the invention, the means for axial displacement and adjustment comprise an adjustment nut which is fitted into the casing and engages with a displacement screw thread cut into the first component, as well as a sliding seat formed between the casing and first component.

Other objects, advantages and novel features of the present invention will become apparent from the following detailed description of the invention when considered in conjunction with the accompanying drawings.

DETAILED DESCRIPTION

Figure 1:
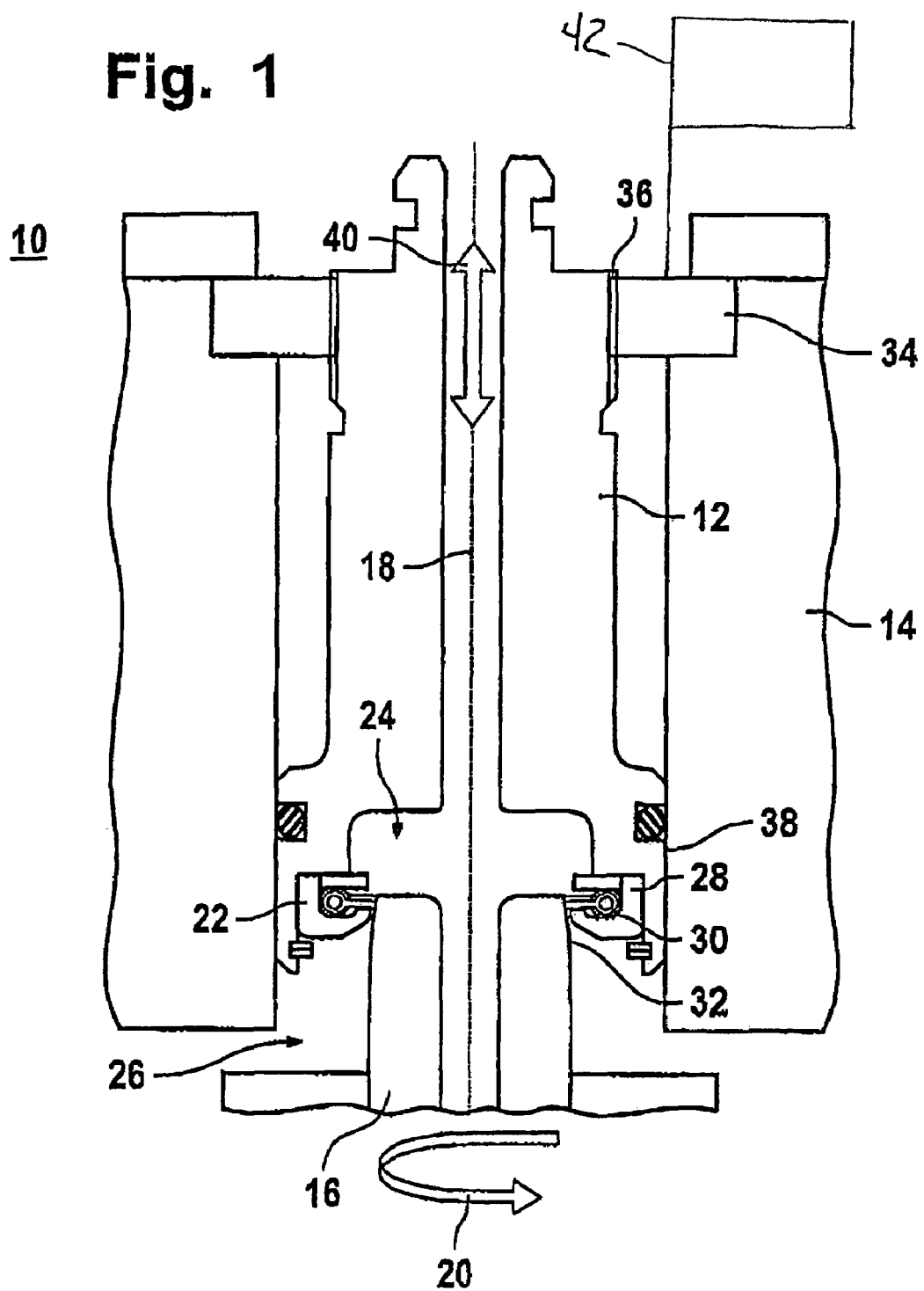
FIG. 1 shows a sectional illustration of the sealing arrangement according to an embodiment of the invention, which allows adjustment of the sealing action of a brush seal.

A sealing arrangement, which is denoted overall by reference numeral 10 in FIG. 1, for sealing a gap between two components which can move rotationally with respect to one another in a turbomachine (not shown in more detail), such as for example a steam turbine or a gas turbine, comprises a first component 12, which is surrounded by a casing 14, and a second component 16. The two components 12, 16 have a common axis of rotation 18.

The second component 16 is mounted such that it can move in rotation with respect to the first component 12 about the axis of rotation 18. The rotational mobility of the second component 16 is indicated by arrow 20.

A brush seal 22 has been introduced into the annular gap between the components 12, 16, in order, for example, to seal off a region 24 which is at a high pressure with respect to a region 26 which is at a lower pressure.

The brush seal 22 in this case comprises a brush casing 28 and a plurality of bristles 30 fitted into the brush casing 28. Whereas the brush casing 28 is mounted in a fixed position in the first component 12, the free ends of the bristles 30 are directed onto a conically designed sealing surface 32 of the second component 16.

Simple axial displacement and adjustment of the first component 12 in the casing 14 along the axis of rotation 18 is ensured by means of an adjustment nut 34 which is fitted into the casing 14 and engages with a displacement screw thread 36 cut into the first component 12. A sliding seat 38 between first component 12 and casing 14 is provided as further axial guidance for the first component 12 in the casing 14.

An axial displacement, indicated by an arrow 40 in FIG. 1, is as a result made possible in a simple way. The adjustment nut 34 may be actuated by a mechanical and/or hydraulic actuator 42. The actuator 42 may be one of a variety of drive devices which will be obvious to those skilled in the art, and therefore is not illustrated in detail in the figures.

On account of the conical configuration of the sealing surface 32, the size of the gap between the two components 12, 16 is reduced in the event of an axial displacement 40 of the first component 12 in the direction of the second component 16.

Consequently, it is now possible to reset the sealing action of the brush seal 22. A reduction in the gap size in this context means that the sealing action of the brush seal 22 is increased.

Figure 2:
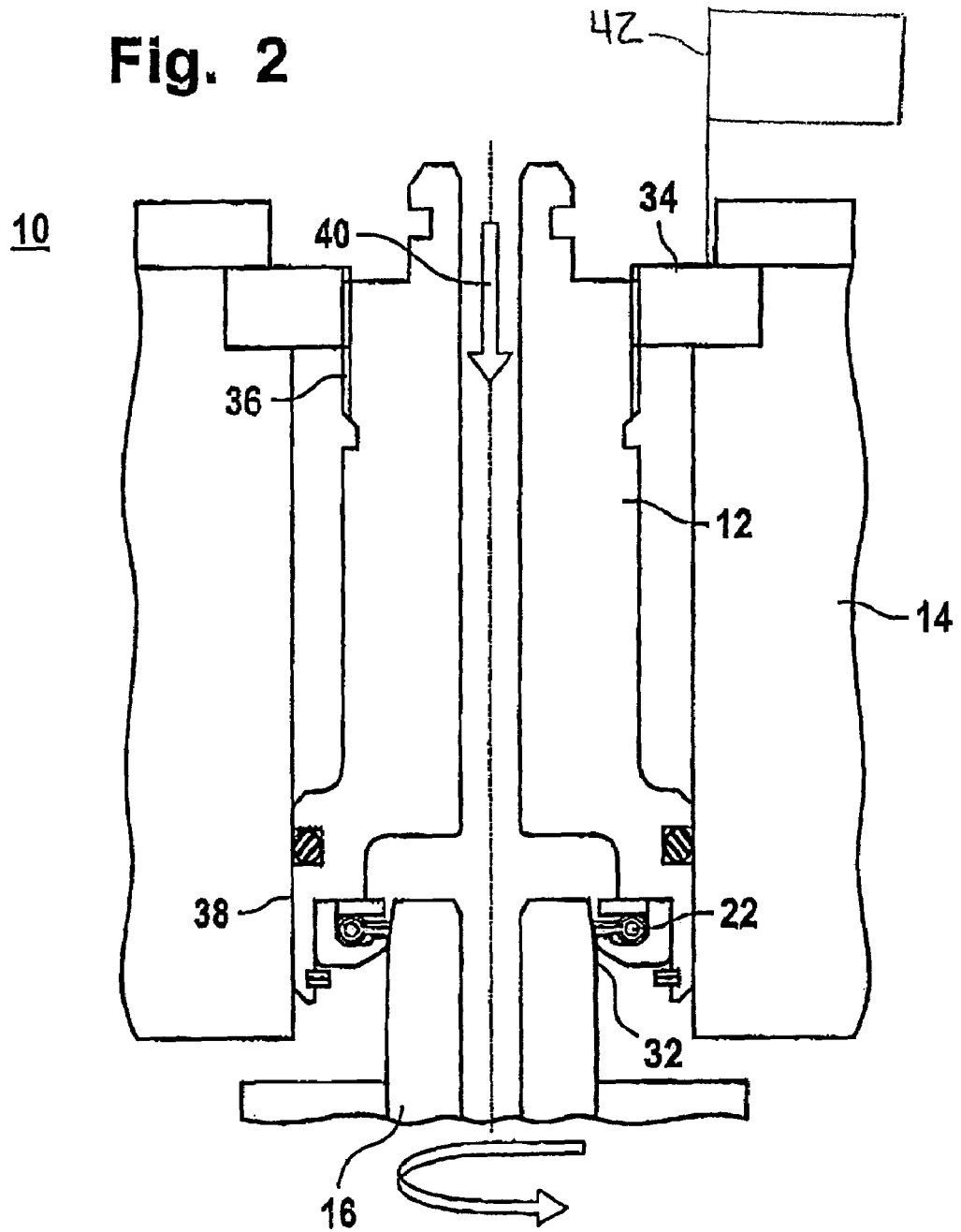
FIG. 2 shows the sealing arrangement from FIG. 1 after an adjustment operation.

FIG. 2 shows the sealing arrangement 10 from FIG. 1 after the sealing action has been reset by axial displacement. The gap between the first component 12 and the second component 16 has been reduced in size. The result of this is that the fitted brush seal 22 can remain fitted for a longer period of time, i.e. has a longer service life, which in turn saves costs.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A sealing arrangement for sealing a gap between two components which can move rotationally with respect to one another about a common axis of rotation, having a brush seal which is arranged fixedly in the first component of the two components and interacts with a sealing surface of the second component, wherein the sealing surface is a surface of a shaft end of the second component which is conical in form, with the first component being axially displaceable and adjustable with respect to the second component, the first component being disposed axially adjacent to the second component shaft end, and means for axial displacement and adjustment being provided between the first component and a casing surrounding the first component, such that when the first component is axially displaced, the brush seal is axially displaced relative to the second component while remaining in sealing contact with the second component sealing surface.

2. The sealing arrangement as claimed in claim 1, wherein the means for axial displacement and adjustment comprise a sliding seat, an adjustment nut which is fitted into the casing and a displacement screw thread cut into the first component.

3. The sealing arrangement as claimed in claim 1, wherein the axial displacement is controlled by at least one threaded connection between one of the components and a casing which receives said component.

4. The sealing arrangement as claimed in claim 1, wherein the axial displacement is controlled by at least one of a mechanical and a hydraulic adjuster.

* * * * *